United States Patent [19]

Joshi et al.

[11] 4,377,624

[45] Mar. 22, 1983

[54] NOVEL CATHODES FOR PRIMARY SOLID ELECTROLYTE CELLS

[75] Inventors: Ashok V. Joshi, Levittown, Pa.; Charles C. Liang, Clarence, N.Y.

[73] Assignee: Duracell Inc., Bethel, Conn.

[21] Appl. No.: 318,077

[22] Filed: Nov. 3, 1981

Related U.S. Application Data

[63] Continuation of Ser. No. 945,285, Sep. 25, 1978, abandoned, which is a continuation-in-part of Ser. No. 790,726, Apr. 25, 1977, abandoned.

[51] Int. Cl.$^3$ ............................................. H01M 6/18
[52] U.S. Cl. ................................... 429/191; 429/193; 429/218
[58] Field of Search ......................... 429/191, 193, 218

[56] References Cited

U.S. PATENT DOCUMENTS

| | | |
|---|---|---|
| 3,713,897 | 1/1973 | Liang .................................. 429/191 |
| 3,988,164 | 10/1976 | Liang et al. .......................... 429/191 |
| 4,009,052 | 2/1977 | Whittingham ....................... 429/191 |

Primary Examiner—Donald L. Walton
Attorney, Agent, or Firm—Ronald S. Cornell; Israel Nissenbaum

[57] ABSTRACT

High energy density primary solid state cells using as a cathode, ionically and electronically conductive dischargeable metal chalcogenides.

5 Claims, No Drawings

NOVEL CATHODES FOR PRIMARY SOLID ELECTROLYTE CELLS

This is a continuation of application Ser. No. 945,285, filed Sept. 25, 1978 now abandoned which is a continuation-in-part of U.S. Ser. No. 790,726 filed Apr. 25, 1977, now abandoned.

This invention relates to primary high energy density cells utilizing solid electrolytes, solid active metal anodes and novel solid cathodes, and more particularly to such cells in which the cathodes contain an active material which is both ionically and electronically conductive.

Recently the state of electronics has achieved a high degree of sophistication especially in regard to devices utilizing integrated circuit chips which have been proliferating in items such as quartz crystal watches, calculators, cameras, pacemakers and the like. Miniaturization of these devices as well as low power drainage and relatively long lives under all types of conditions has resulted in a demand for power sources which have characteristics of rugged construction, long shelf life, high reliability, high energy density and an operating capability over a wide range of temperatures as well as concomitant miniaturization of the power source. These requirements pose problems for conventional cells having solution or even paste type electrolytes especially with regard to shelf life. The electrode materials in such cells may react with the electrolyte solutions and tend therefore to self discharge after periods of time which are relatively short when compared to the potential life of solid state batteries. There may also be evolution of gases in such cells which could force the electrolyte to leak out of the battery seals, thus corroding other components in the circuit which in sophisticated componentry can be very damaging. Increasing closure reliability is both bulky and costly and will not eliminate the problem of self discharge. Additionally, solution cells have a limited operating temperature range dependent upon the freezing and boiling points of the contained solutions.

Success in meeting the above demands without the drawbacks of solution electrolyte systems has been achieved with the use of solid electrolyte and electrode cells or solid state cells which do not evolve gases, self discharge on long standing or have electrolyte leakage problems. These systems however have had their own particular limitations and drawbacks not inherent in solution electrolyte cells.

Ideally a cell should have a high voltage, a high energy density, and a high current capability. Prior art solid state cells have however been deficient in one or more of the above desirable characteristics.

A first requirement and an important part of the operation of any solid state cell is the choice of solid electrolyte. In order to provide good current capability a solid electrolyte should have a high ionic conductivity which enables the transport of ions through defects in the crystalline electrolyte structure of the electrode-electrolyte system. An additional, and one of the most important requirements for a solid electrolyte, is that it must be virtually solely an ionic conductor. Conductivity due to the mobility of electrons must be neglible because otherwise the resulting partial internal short circuiting would result in the consumption of electrode materials even under open circuit conditions. Solution electrolyte cells include an electronically non-conductive separator between the electrode elements to prevent such a short circuit, whereas solid state cells utilize the solid electrolyte as both electronic separator and the ionic conductive species.

High current capabilities for solid state cells have been attained with the use of materials which are solely ionic conductors such as $RbAg_4I_5$ (0.27 $ohm^{-1} cm^{-1}$ room temperature conductivity). However these conductors are only useful as electrolytes in cells having low voltages and energy densities. As an example, a solid state $Ag/RbAg_4I_5/RbI_3$ cell is dischargeable at 40 $mA/cm$ at room temperature but with about 0.2 $Whr/in^3$ and an OCV of 0.66 V. High energy density and high voltage anodic materials such as lithium are chemically reactive with such conductors thereby precluding the use of these conductors in such cells. Electrolytes which are chemically compatible with the high energy density and high voltage anode materials such as LiI, even when doped for greater conductivity, do not exceed a conductivity of $5 \times 10^{-5} ohm^{-1} cm^{-1}$ at room temperature. Thus, high energy density cells with an energy density ranging from about 5-10 $Whr/in^3$ and a voltage at about 1.9 volts for a Li/LiI-doped/$PbI_2$, PbS, Pb cell currently being produced are precluded from having an effective high current capability above 50 $\mu A/cm^2$ at room temperature. As a result of such relatively low current capabilities, practical rechargeability is generally precluded thereby making increased energy density of cells of primary importance. However, a further aggravation of the reduced current capability of high energy density cells is the low conductivity (both electronic and ionic) of active cathode materials. Accordingly, conductivity enhancers such as graphite for electronic conductivity and electrolyte for ionic conductivity are added to the cathode. The current capability of the cell is increased to the maximum allowed by the conductivity of the electrolyte but at the cost of reduced energy density of the cell because of the volume occupied by the non-cathode active conductivity enhancers.

Commercial feasibility in production of the electrolyte material is another factor to be considered in the construction of solid state cells. Thus, the physical properties of solid electrolytes such as $BaMg_5S_6$ and $BaMg_5Se_6$, which are compatible with a magnesium but not a lithium anode, and solid sodium beta aluminas such as $Na_2O.11\, Al_2O_3$, which are compatible with sodium anodes, will preclude the fabrication of room temperature solid state cells having a high energy density or current capability even when costly production steps are taken. These electrolytes have ceramic characteristics making them difficult to work with especially in manufacturing processes involving grinding and pelletization with such processes requiring a firing step for structural integrity. Furthermore, the glazed material so formed inhibits the essential (for solid state cells) good surface contact with the electrodes with a result of poor conductivity leading to poor cell performance. These electrolytes are thus typically used in cells with molten electrodes wherein surface contact of electrolyte and electrode is assured by the fluid form of the electrodes.

It is therefore an object of the present invention to increase the conductivity of the cathode of solid state cells in conjunction with high energy density anodes and compatible electrolytes such that there is an increase in energy density without current capability losses resulting from the addition of inert conductive materials, while maintaining chemical stability between the cell components.

Generally the present invention involves the formation of the cathode of a solid state cell with a material which has the characteristics of being both ionically and electronically conductive as well as being able to function as an active cathode material. Normally cathodes require the incorporation of substantial amounts (e.g. over 20 percent by weight) of an ionic conductor such as that used as the electrolyte in order to facilitate ionic flow in the cathode during the cell reaction. This is especially true if the cathodic material is an electronic conductor since otherwise a reduction product would form at the cathode-electrolyte interface which would eventually block off a substantial amount of the ionic flow during discharge. However the incorporated ionic conductors in prior art cells have not generally been cathode active materials with the result of significant capacity loss. Additionally, cathode active materials which are poor electronic conductors as well require the further incorporation of electronically conductive materials which further reduces the cell's energy capacity. By combining the functions of electronic and ionic conductivity with cathode activity a higher energy density and current capability is attained with the need for space wasting conductors being obviated.

Examples of materials having the requisite characteristics of ionic and electronic conductivity and which are cathodically active as well as being compatible with electrolytes used in high energy density cells include the following metal chalcogenides: $CoTe_2$, $Cr_2S_3$, $HfS_2$, $HfSe_2$, $HfTe_2$, $IrTe_2$, $MoS_2$, $MoSe_2$, $MoTe_2$, $NbS_2$, $NbSe_2$, $NbTe_2$, $NiTe_2$, $PtS_2$, $PtSe_2$, $PtTe_2$, $SnS_2$, $SnSS_e$, $SnSe_2$, $TaS_2$, $TaSe_2$, $TaTe_2$, $TiS_2$, $TiSe_2$, $TiTe_2$, $VS_2$, $VSe_2$, $VTe_2$, $WS_2$, $WSe_2$, $WTe_2$ $ZrS_2$, $ZrSe_2$, and $ZrTe_2$, wherein the chalcogenide is a sulfide, selenide, telluride or combination.

Also included are the non-stoichiometric metal chalcogenide compounds such as $Li_xTiS_2$ where $x<1$, which to some extent contain the complexed form of one of the cathode materials with the anodic cation and which are believed to be intermediate reaction products during cell discharge.

In order for the ionically-electronically conductive cathode active material to be commercially useful in high voltage cells having lithium anodes it should be able to provide a voltage couple with lithium of at least an O.C.V. of 1.5 volts and preferably above 2 volts.

A further criteria for the above cathodic material is that both the ionic and electronic conductivities of the cathode active material should range between $10^{-10}$ and $10^2$ ohm$^{-1}$ cm$^{-1}$ with a preferred ionic conductivity of more than $10^{-6}$ and an electronic conductivity greater than $10^{-3}$, all at room temperature.

In addition, and most importantly, the ionically-electronically conductive active cathode material must be compatible with the solid electrolytes used in the high energy density cells.

The above metal chalcogenides generally have lower theoretical energy densities than known non-conductive metal chalcogenides such as lead sulfide (Liang et al U.S. Pat. No. 3,988,164). However their ionic and electronic conductivities enable them to be utilized to a greater extent making comparable or superior to the known non-conductive metal chalcogenides in actual performance. Though some of the above metal chalcogenides have been previously utilized in rechargeable cells (Whittingham U.S. Pat. No. 4,009,052) it is their rechargeable properties which makes them useful therein. Since their theoretical energy densities are relatively low compared to known cathodes they have not been used in practical primary cells. Accordingly, their use in primary high energy density solid state cells would normally be precluded because of the practical inability of such cells to be recharged and the relatively low energy density of such metal chalcogenides. Surprisingly the relatively low theoretical energy density is compensated by the ability of such metal chalcogenides to be completely discharged with only small amounts if any, of non-active conductive materials therein. Though U.S. Pat. No. 4,009,052 describes solid electrolytes for use with metal chalcogenides such solid electrolytes are generally used in high temperature or molten electrodes wherein rechargeability is possible. Such cells are not considered solid state cells as in the present invention.

The solid electrolytes used in high energy density lithium cells are lithium salts and have room temperature ionic conductivities greater than $1 \times 10^{-9}$ ohm$^{-1}$ cm$^{-1}$. These salts can either be in the pure form or combined with conductivity enhancers such that the current capability is improved thereby. Examples of lithium salts having the requisite conductivity for meaningful cell utilization include lithium iodide (Li) and lithium iodide admixed with lithium hydroxide (LiOH) and aluminum oxide ($Al_2O_3$) with the latter mixture being referred to as LLA and disclosed in U.S. Pat. No. 3,713,897.

High energy density solid electrolyte cells may have as their anodes materials similar to lithium which have high voltage and low electrochemical equivalent weight characteristics. Suitable anodic materials include metals from Groups IA and IIA of the Periodic Table such as sodium, potassium, beryllium, magnesium and calcium as well as aluminum from Group IIIA and other metals above hydrogen in the EMF series.

Cells with other anodes can utilize corresponding salts as electrolytes such as sodium salts for a cell with a sodium anode. Additionally, electrolyte salts with useful conductivities and having a cation of a metal of a lower EMF than that of the anode metal may also be useful.

Generally such electrolytes have conductivities no greater than about $5 \times 10^{-5}$ ohm$^{-1}$ cm$^{-1}$ and cells containing such electrolytes are generally precluded from being usefully rechargeable.

It is postulated that the aforementioned ionically-electronically conductive cathode active materials react with the ions of the anode (e.g. lithium cations) to form a non-stoichiometric complex during the discharge of the cell. This complexing of cations allows them to move from site to site thereby providing ionic conductivity. Additionally the above compounds provide the free electrons necessary for electronic conductivity.

A limiting factor in solid state cell performance is the conductivity of the cell reaction product. A low conductivity product results in large internal resistance losses which effectively terminate cell usefulness. Thus a further advantage of cells having the above-ionically-electronically conductive cathode active material is that the complexed reaction product retains conductivity thereby enabling full utilization of the cathode.

The non-stoichiometric complexing of the metal chalcogenides surprisingly provides the full extent of the reaction of the metal chalcogenides. Accordingly, they are stable in conjunction with high energy density cell electrolytes such as the aforementioned LLA. Thus, there are no side reactions of, for example, titanium disulfide with lithium iodide ($TiS_2 + 4LiI \rightarrow TiI_4 + 2Li_2S$) as may be expected to at least a small extent at the cathode-electrolyte interface. The formation of non-conductive $TiI_4$ or $Li_2S$ for example, may even in small amounts choke off further cell reaction in solid state cells whereas in cells with a fluid interface between cathode and electrolyte such as in U.S. Pat. No. 4,009,052 the formation of such reactants would have minimal effect if any.

A small amount of electrolyte can also be included in the cathode structure in order to blur the interface between cathode and electrolyte thereby providing more intimate electrical contact between the cathode and the electrolyte. This enables the cell to operate at higher current drains for longer periods of time. Additionally the electrolyte inclusion can increase the ionic conductivity of the cathode should the ionically conductive cathode active material have a lower conductivity than that of the electrolyte. This inclusion however, if made, should not exceed 10% by weight since greater amounts would merely decrease the energy density of the cell with little if any further tradeoff in terms of current drain capacity. Accordingly the cathode should include at least 90% by weight of the ionically-electronically conductive cathode active material.

In order that the present invention be more completely understood the following examples are given with all parts being by weight unless otherwise specified. The examples are only for illustrative purposes and should not be taken as limitations of either cell construction or of materials contained therein.

EXAMPLE 1

A solid state electrochemical cell is formed using a lithium metal disc having dimensions of about 1.47 cm$^2$ contact surface area by about 0.01 cm thickness; a cathode disc having dimensions of about 1.71 cm$^2$ contact surface area by about 0.02 cm thickness consisting of titanium disulfide (TiS) and weighing about 100 mg, and a solid electrolyte with the same dimensions as the cathode and consisting of LiI, LiOH, and $Al_2O_3$ in a 4:1:2 ratio. The electrolyte is first pressed with the cathode at a pressure of about 100,000 psi. The anode is then pressed to the other side of the electrolyte using about 50,000 psi. The resulting cell is discharged at a temperature of 72° C. under a load of 10kΩ. The cell realizes 14 milliamp hours (mAH) to 2 volts, 21 mAH to 1.5 volts, and about 24 mAH to 1 volt.

The titanium disulfide in the above Example is both a good ionic and electronic conductor ($\sim 10^{-5}$ ohm$^{-1}$ cm$^{-1}$ ionic conductivity and greater than $10^{-2}$ ohm$^{-1}$ cm$^{-1}$ electronic conductivity at room temperature) and thus constitutes the cathode without conductive additives. The titanium disulfide functions as a reactive species in the cell reaction with the lithium cations to form the non-stoichiometric $Li_xTiS_2$ which is also ionically and electronically conductive thus further ameliorating the problem of incomplete cell discharge resulting from non-conductive reaction products choking off further cell reaction.

The ionically-electronically conductive, cathode active materials can be admixed with one another to form a cathode as in the following EXAMPLES.

EXAMPLE 2

A solid state cell is made in accordance with EXAMPLE 1 but with the cathode having a contact surface area of 1.82 cm$^2$ and comprising a 1:1 mixture of titanium disulfide and molybdenum disulfide weighing about 50 mg. The cell is discharged at 27° C. under a load of 18 µA. The cell realizes 2.2 mAH to 2 volts, 5 mAH to 1.5 volts and 5.9 mAH to 1 volt.

EXAMPLE 3

A cell identical to the cell in EXAMPLE 2 is discharged at 27° C. under a load of 36 µA. The cell realizes about 1 mAH to 2 volts, about 3 mAH to 1.5 volts and about 5 mAH to 1 volt.

It is understood that other disclosed conductive metal chalcogenides can function similarly whether without any further conductive enhancers or with a maximum of 10% of conductive materials and such materials also fall within the scope of the present invention as defined by the following claims.

What is claimed is:

1. A primary solid state electrochemical cell operable in such state at room temperature comprising a solid active metal anode, a solid electrolyte comprising a lithium salt having a room temperature ionic conductivity greater than $1 \times 10^{-9}$ ohm$^{-1}$ cm$^{-1}$ and a solid cathode wherein said cathode consists of one or more metal chalcogenides wherein the ionic and electronic conductivity of said metal chalcogenides ranges between $10^{-10}$ to $10^2$ ohm$^{-1}$ cm$^{-1}$ at room temperature.

2. The primary solid state electrochemical cell of claim 1 wherein said active metal anode is comprised of lithium.

3. The primary solid state electrochemical cell of claim 2 wherein said solid electrolyte is comprised of lithium iodide.

4. The primary solid state electrochemical cell of claim 3 wherein said solid electrolyte further includes lithium hydroxide and aluminum oxide.

5. The primary solid state electrochemical cell of claim 4 wherein said metal chalcogenide is titanium disulfide.

* * * * *